(12) United States Patent
Wang et al.

(10) Patent No.: US 11,272,204 B2
(45) Date of Patent: Mar. 8, 2022

(54) MOTION COMPENSATION METHOD AND DEVICE, AND COMPUTER SYSTEM

(71) Applicant: SZ DJI TECHNOLOGY CO., LTD., Shenzhen (CN)

(72) Inventors: Zhao Wang, Shenzhen (CN); Siwei Ma, Shenzhen (CN); Xiaozhen Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/993,243

(22) Filed: Aug. 13, 2020

(65) Prior Publication Data
US 2020/0374540 A1 Nov. 26, 2020

Related U.S. Application Data

(63) Continuation of application No. PCT/CN2018/076852, filed on Feb. 14, 2018.

(51) Int. Cl.
*H04N 19/105* (2014.01)
*H04N 19/122* (2014.01)
(Continued)

(52) U.S. Cl.
CPC ......... *H04N 19/513* (2014.11); *H04N 19/105* (2014.11); *H04N 19/122* (2014.11); *H04N 19/176* (2014.11)

(58) Field of Classification Search
CPC .................... H04N 19/513; H04N 19/105
See application file for complete search history.

(56) References Cited

U.S. PATENT DOCUMENTS 8,395,671 B2 * 3/2013 Kimura ............... G06T 7/246
348/208.14
8,478,057 B1 7/2013 Cui et al.
(Continued)

FOREIGN PATENT DOCUMENTS

CN 1805546 A 7/2006
CN 102984525 A 3/2013
(Continued)

OTHER PUBLICATIONS

Bernd Girod, Motion-Compensating Prediction with Fractional-Pel Accuracy, IEEE Transactions on Communications, Apr. 1993, vol. 41, No. 4, pp. 604-612.
(Continued)

*Primary Examiner* — Irfan Habib
(74) *Attorney, Agent, or Firm* — Anova Law Group, PLLC

(57) ABSTRACT

A motion compensation method includes determining one or more weighting coefficients of a predicted value of a target pixel to be processed according to at least one of a first parameter or a second parameter, and determining the predicted value of the target pixel according to the weighting coefficient. The target pixel is in a boundary pixel block of a current image block. The first parameter is a size of the current image block or a distance between the target pixel and a center position of the current image block. The second parameter is a size of an adjacent image block of the current image block or a distance between the target pixel and a center position of the adjacent image block.

16 Claims, 5 Drawing Sheets

(51) Int. Cl.
*H04N 19/513* (2014.01)
*H04N 19/176* (2014.01)

(56) References Cited

U.S. PATENT DOCUMENTS

| | | | | |
|---|---|---|---|---|
| 9,253,508 B2* | 2/2016 | Gao | .................... | H04N 19/176 |
| 9,380,301 B2* | 6/2016 | Yasugi | ................... | H04N 19/50 |
| 9,516,349 B2* | 12/2016 | Gao | ....................... | H04N 19/46 |
| 9,781,447 B1* | 10/2017 | Bultje | .................. | H04N 19/105 |
| 9,955,171 B2* | 4/2018 | Tsukuba | ............... | H04N 19/139 |
| 10,306,237 B2* | 5/2019 | Tsukuba | ............... | H04N 19/593 |
| 10,412,393 B2* | 9/2019 | Zeng | ...................... | H04N 19/82 |
| 10,567,793 B2* | 2/2020 | Mukherjee | ........... | H04N 19/182 |
| 10,687,053 B2* | 6/2020 | Jun | ....................... | H04N 19/105 |
| 10,798,414 B2* | 10/2020 | Lee | ...................... | H04N 19/593 |
| 10,931,946 B2* | 2/2021 | Minezawa | ............. | H04N 19/80 |
| 2006/0159351 A1 | 7/2006 | Bae et al. | | |
| 2010/0118943 A1* | 5/2010 | Shiodera | ................ | H04N 19/61 375/240.12 |
| 2015/0131728 A1 | 5/2015 | Wang et al. | | |
| 2016/0171664 A1* | 6/2016 | Komiya | ............... | G06K 9/6212 382/275 |
| 2016/0330475 A1* | 11/2016 | Zhou | .................... | H04N 19/583 |
| 2017/0353735 A1* | 12/2017 | Mukherjee | ........... | H04N 19/182 |
| 2018/0184118 A1* | 6/2018 | Mukherjee | ........... | H04N 19/176 |
| 2019/0273926 A1* | 9/2019 | Heo | ........................ | H04N 19/11 |

FOREIGN PATENT DOCUMENTS

| | | |
|---|---|---|
| CN | 103999465 A | 8/2014 |
| CN | 106600544 A | 4/2017 |
| CN | 107465923 A | 12/2017 |
| CN | 107534767 A | 1/2018 |
| WO | 2009150793 A1 | 12/2009 |

OTHER PUBLICATIONS

Jianle Chen, et al., Algorithm Description of Joint Exploration Test Model 7 (JEM 7), Joint Video Exploration Team (JVET), Jul. 2017.
JVET Software Repository, available online: https://jvet.hhi.fraunhofer.de/svn/svn_HMJEMSoftware/.
The World Intellectual Property Organization (WIPO) International Search Report for PCT/CN2018/076852 dated Jun. 27, 2018 5 pages.

* cited by examiner

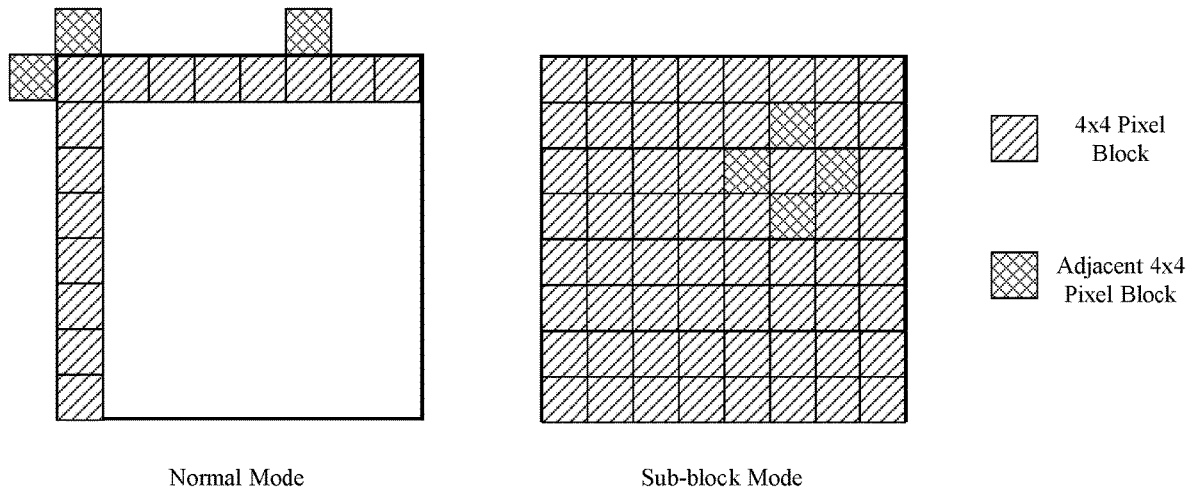

Normal Mode    Sub-block Mode

Determine a weighting coefficient of a predicted value of a pixel to be processed according to a first parameter and/or a second parameter, where the pixel to be processed is a pixel in a boundary pixel block of a current image block, the first parameter is a size of the current image block or a distance between the pixel to be processed and a center position of the current image block, and the second parameter is a size of an adjacent image block of the current image block or a distance between the pixel to be processed and a center position of the adjacent image block ~ 510

Determine the predicted value of the pixel to be processed according to the weighting coefficient ~ 520

FIG. 5

MOTION COMPENSATION METHOD AND DEVICE, AND COMPUTER SYSTEM

CROSS-REFERENCE TO RELATED APPLICATION

This application is a continuation of International Application No. PCT/CN2018/076852, filed Feb. 14, 2018, the entire content of which is incorporated herein by reference.

The content disclosed in this disclosure contains material which is subject to copyright protection. The copyright is owned by the copyright owner. The copyright owner has no objection to the facsimile reproduction by anyone of the patent document or the patent disclosure as it appears in the official records and archives of the Patent and Trademark Office.

TECHNICAL FIELD

The present disclosure relates to the field of information technology and, more particularly, to a motion compensation method and device, and a computer system.

BACKGROUND

Prediction is an important module of the video coding framework and is implemented by motion compensation. A frame of image is first divided into coding tree units (CTUs) of an equal size, such as a coding unit with a size of 64×64 or 128×128. Each CTU can be further divided into square or rectangular coding image blocks. For each image block, the most similar image block in a reference frame (usually a composite frame in the temporal domain) is found as a predicted image block for the current image block. A relative displacement between the current image block and the similar image block is a motion vector (MV). The process of finding similar image blocks in the reference frame as the predicted value of the current image block is motion compensation. In general, the image block may be a coding unit (CU) or a prediction unit (PU).

The general motion compensation is to obtain a predicted image block for each image block according to the motion vector of the image block. Based on this, there is an overlapped block motion compensation (OBMC) technology. For pixels at the boundary of the current image block, a predicted value is obtained by weighted prediction using the motion vector of the current image block and the motion vector of the adjacent image block.

However, the current OBMC technology uses a fixed weighting coefficient, which limits the performance of OBMC. Therefore, an improved method for motion compensation is needed to improve the performance of motion compensation.

SUMMARY

In accordance with the disclosure, there is provided a motion compensation method including determining one or more weighting coefficients of a predicted value of a target pixel to be processed according to at least one of a first parameter or a second parameter, and determining the predicted value of the target pixel according to the weighting coefficient. The target pixel is in a boundary pixel block of a current image block. The first parameter is a size of a current image block or a distance between the target pixel and a center position of the current image block. The second parameter is a size of an adjacent image block of the current image block or a distance between the target pixel and a center position of the adjacent image block.

Also in accordance with the disclosure, there is provided a computer system including a memory storing computer executable instructions and a processor configured to access the memory and execute the instructions to determine one or more weighting coefficients of a predicted value of a target pixel to be processed according to at least one of a first parameter or a second parameter, and determine the predicted value of the target pixel according to the weighting coefficient. The target pixel is in a boundary pixel block of a current image block. The first parameter is a size of the current image block or a distance between the target pixel and a center position of the current image block. The second parameter is a size of an adjacent image block of the current image block or a distance between the target pixel and a center position of the adjacent image block.

BRIEF DESCRIPTION OF THE DRAWINGS

FIG. 4 is a schematic diagram showing a boundary pixel block according to an embodiment of the present disclosure.

FIG. 5 is a schematic flowchart of a motion compensation method according to an embodiment of the present disclosure.

DETAILED DESCRIPTION OF THE EMBODIMENTS

The technical solutions in the embodiments of the present disclosure are described below with reference to the accompanying drawings.

The specific examples herein are only to help those skilled in the art to better understand the embodiments of the present disclosure, rather than limiting the scope of the embodiments of the present disclosure.

The formulas in the embodiments of the present disclosure are only examples and do not limit the scope of the embodiments of the present disclosure. Each formula can be modified, and these modifications should also fall within the scope of the present disclosure.

In various embodiments of the present disclosure, the sequence number of each process does not mean the order of execution. The execution order of each process should be determined by its function and inherent logic and should not limit the implementation process of the embodiments of the disclosure.

The various embodiments described in this disclosure may be implemented alone or in combination, which is not limited in the embodiments of the present disclosure.

Unless otherwise defined, all technical and scientific terms used in the disclosure have the same meaning as commonly understood by those of ordinary skill in the art. The terminology used in the specification of the present disclosure is for the purpose of describing specific embodiments only and is not intended to limit the present disclosure. The term "and/or" as used in this disclosure includes any and all combinations of one or more related listed items.

Figure 1:
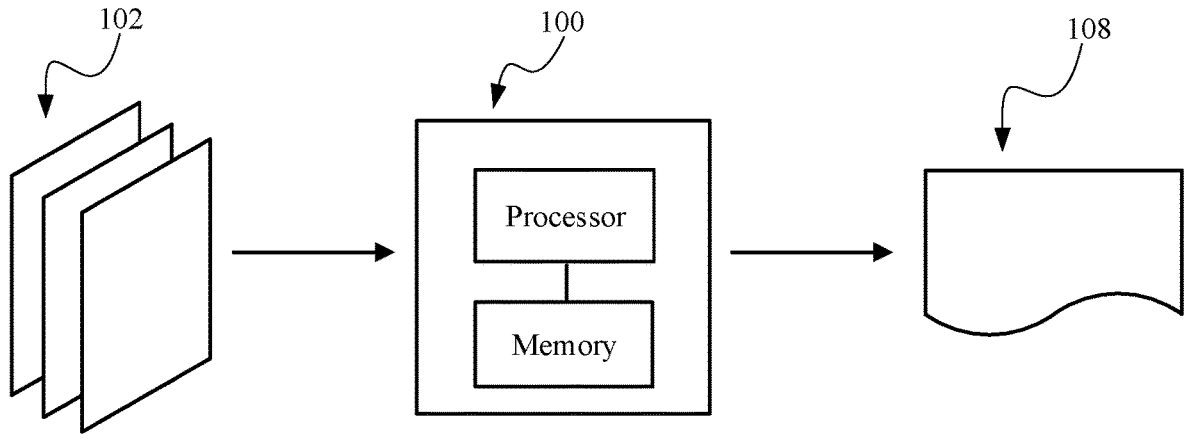
FIG. 1 is an architecture diagram showing a technical solution according to an embodiment of the present disclosure.

FIG. 1 is an architecture diagram showing a technical solution according to an embodiment of the present disclosure.

As shown in FIG. 1, a system 100 may receive data to be processed 102, and the data to be processed 102 is processed to generate processed data 108. For example, the system 100 may receive data to be encoded and the data to be encoded is encoded to generate encoded data, or the system 100 may receive data to be decoded and the data to be decoded is decoded to generate decoded data. In some embodiments, the components in the system 100 may be realized by one or more processors, and the processor may be a processor in a computing device or a processor in a mobile device (such as an unmanned aerial vehicle (UAV)). The processor may be any kind of processor, which is not limited in the embodiments of the present disclosure. In some possible designs, the processor may include an encoder or a decoder. The system 100 may also include one or more memories. The memory may be used to store instructions and data, such as computer-executable instructions that implement the technical solutions of the embodiments of the present disclosure, data to be processed 102, and processed data 108. The memory may be any kind of memory, which is not limited in the embodiments of the present disclosure.

The data to be encoded may include text, images, graphic objects, animation sequences, audios, videos, or any other data that needs to be encoded. In some scenarios, the data to be encoded may include sensor data from a sensor, and the sensor may be a visual sensor (e.g., a camera, an infrared sensor), a microphone, a near-field sensor (e.g., an ultrasonic sensor, a radar), a position sensor, a temperature sensor, a touch sensor, etc. In some scenarios, the data to be encoded may include information from the user, for example, biological information, which may include facial features, fingerprint scanning, retina scanning, voice recording, DNA sampling, or the like.

Encoding is needed for efficient and/or secure transmission or storage of data. The encoding of the data to be encoded may include data compression, encryption, error correction encoding, format conversion, etc. For example, compression of multimedia data (such as video or audio) can reduce the number of bits transmitted in the network. Sensitive data, such as financial information and personal identification information, can be encrypted before transmission and storage to protect confidentiality and/or privacy. In order to reduce the bandwidth occupied by video storage and transmission, video data needs to be encoded and compressed.

Any suitable encoding technique may be used to encode the data to be encoded. The encoding type depends on the data to be encoded and the specific encoding needs.

In some embodiments, the encoder may implement one or more different codecs. Each codec can include codes, instructions, or computer programs that implement different encoding algorithms. Based on various factors, such as the type and/or source of the data to be encoded, the receiving entity of the encoded data, available computing resources, the network environment, the business environment, rules and standards, etc., a suitable encoding algorithm can be selected to encode the given data to be encoded.

For example, the encoder may be configured to encode a series of video frames. A series of processes can be performed to encode the data in each frame. In some embodiments, the encoding process may include prediction, transformation, quantization, entropy encoding, and etc.

Prediction includes intra prediction and inter prediction, the purpose of which is to use the predicted block data to remove the redundant information of the current image block to be encoded. Intra prediction uses the information of the current image to obtain predicted block data. Inter prediction uses the information of a reference frame to obtain the predicted block data. The process includes dividing the image block to be encoded into several sub-image blocks. For each sub-image block, a predicted block is obtained by searching for an image block that best matches the current sub-image block in the reference image, and then a residual is obtained by subtracting the corresponding pixel values of the sub-image block and the predicted block. The residuals of the image block are obtained by combining the corresponding residuals of the obtained sub-image blocks together.

Using a transformation matrix to transform the residual block of the image can remove the correlation of the residuals of the image blocks, that is, to remove redundant information of the image blocks, therefore the coding efficiency is improved. The transformation of the data block in the image block usually adopts two-dimensional transformation, that is, the residual information of the data block is multiplied by an N×M transformation matrix and its transposed matrix at the encoding end, and the transformation coefficients are obtained after multiplication. The transformation coefficients can be quantized to obtain quantized coefficients. Finally, the quantized coefficients are entropy encoded to obtain an entropy-coded bitstream. The entropy-coded bitstream and the encoding mode information after encoding, such as intra prediction mode, motion vector information, etc., are stored or sent to the decoding end. At the image decoding end, the entropy-coded bitstream is obtained and the entropy decoding is performed to obtain the corresponding residuals. The predicted image block corresponding to the image block is obtained based on the decoded motion vector, intra prediction and other information. Then the value of each pixel in the current sub-image block is obtained according to the predicted image block and the residuals of the image block.

Figure 2:
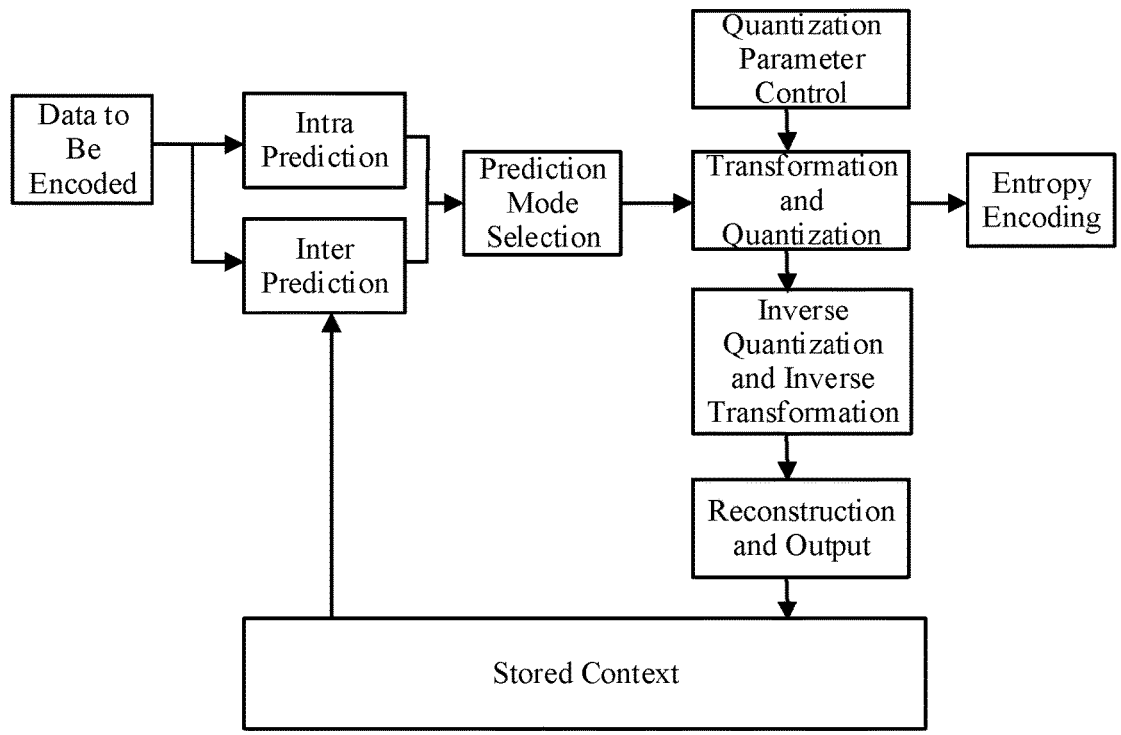
FIG. 2 is a processing architecture diagram of an encoder according to an embodiment of the present disclosure.

FIG. 2 is a processing architecture diagram of an encoder according to an embodiment of the present disclosure. As shown in FIG. 2, the prediction process includes intra prediction and inter prediction. Through prediction processing, the residuals corresponding to the data units (for example, pixel points) can be obtained. When the prediction is performed on a certain pixel, the reconstructed pixel of the reference pixel can be obtained from the stored context, and a pixel residual corresponding to the pixel can be obtained according to the pixel obtained after reconstruction of the reference pixel and the certain pixel. The pixel residuals are transformed, quantized and entropy encoded. In the quantization process, the bit rate can be controlled by controlling the quantization parameters. The pixel residual after quantization corresponding to a certain pixel can also be inversely quantized, inversely transformed, and then reconstructed to obtain the reconstructed pixel of the certain pixel. The reconstructed pixel of the certain pixel can be stored. When the certain pixel is used as a reference pixel, the reconstructed pixel of the certain pixel can be used to obtain the pixel residual corresponding to the other pixel.

The quantization parameter may include a quantization step size, a value indicating the quantization step size or related to the quantization step size, such as a quantization parameter (QP) in H.264, H.265, or a similar encoder, or a quantization matrix or its reference matrix, etc.

For the decoding end, an operation corresponding to the encoding operation at the encoding end is performed to decode the encoded data to obtain original data, that is, data to be encoded.

Figure 3:
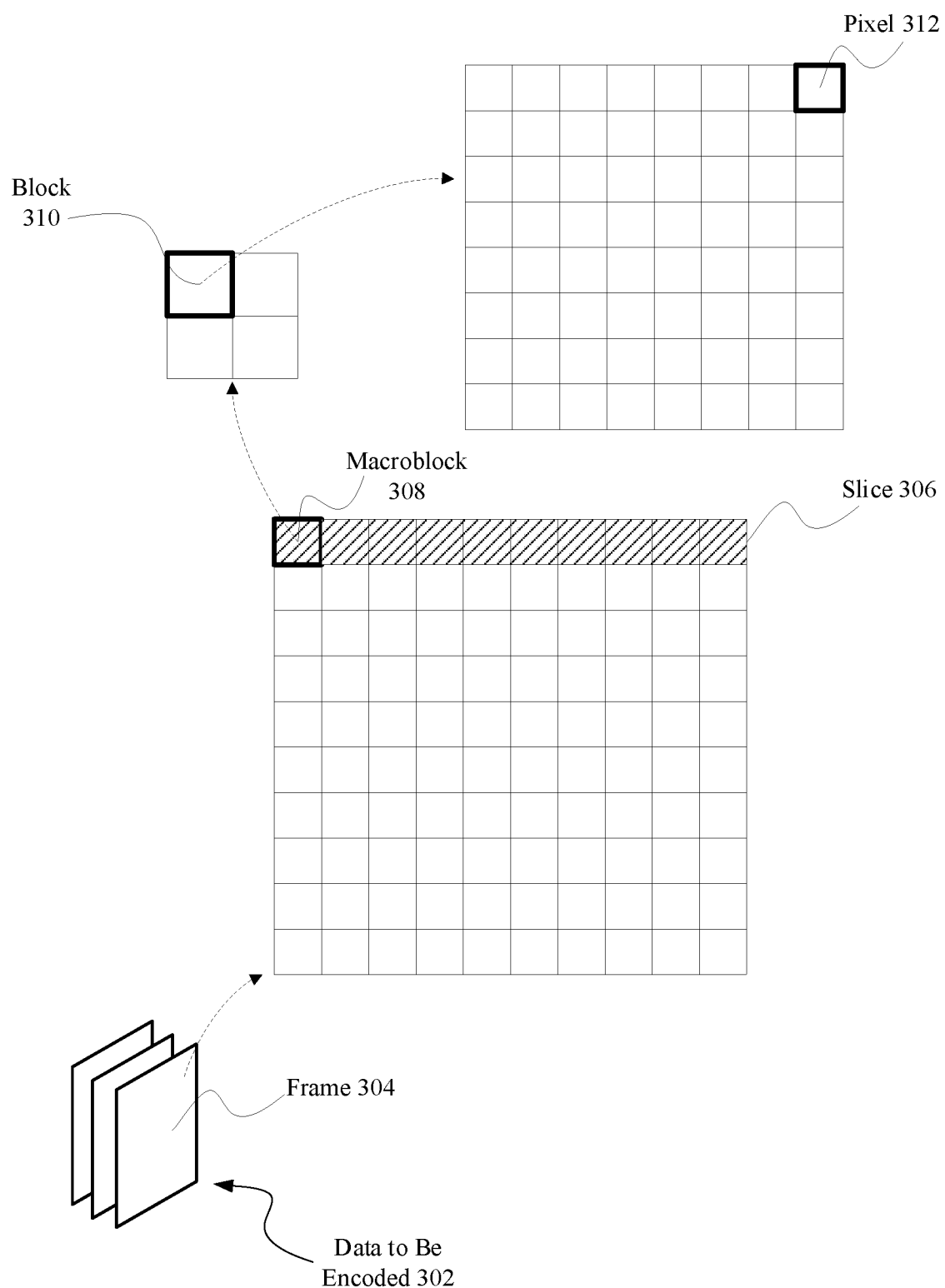
FIG. 3 is a schematic diagram showing data to be encoded according to an embodiment of the present disclosure.

FIG. 3 is a schematic diagram showing data to be encoded 302 according to an embodiment of the present disclosure.

As shown in FIG. 3, the data to be encoded 302 includes a plurality of frames 304. For example, the plurality of frames 304 may represent consecutive image frames in the video stream. Each frame 304 includes one or more slices or tiles 306. Each slice or tile 306 includes one or more macroblocks or coding units 308. Each macroblock or coding unit 308 includes one or more blocks 310. Each block 310 includes one or more pixels 312. Each pixel 312 may include one or more data sets, corresponding to one or more data portions, such as a luminance data portion and a chrominance data portion. The data unit may be a frame, a slice, a tile, a coding unit, a macroblock, a block, a pixel, or any group of the above. In different embodiments, the size of the data unit may vary. In the example shown in FIG. 3, one frame 304 includes 100 slices 306, each slice 306 includes 10 macroblocks 308, each macroblock 308 includes 4 (e.g., 2×2) blocks 310, and each block 310 includes 64 (e.g., 8×8) pixels 312.

The technical solutions of the embodiments of the present disclosure may be used in the prediction process of encoding or decoding to perform motion compensation on pixels in boundary pixel blocks of an image block.

In the OBMC technology, a current encoded image block is divided into 4×4 pixel blocks. According to the prediction mode of the current image block, the OBMC can involve one of two modes: a normal mode and a sub-block mode. When the current image block has only one motion vector (such as normal inter prediction, normal merge mode), OBMC uses the normal mode. When each 4×4 pixel block of the current image block has its own motion vector (such as sub-block merge mode, affine mode, or decoding end motion vector derivation mode), OBMC uses sub-block mode. FIG. 4 schematically shows OBMC. In the normal OBMC mode, the boundary 4×4 pixel block of the current block is processed, and the predicted values of the 4 rows/columns of pixels of each 4×4 boundary pixel block are changed according to the motion vector of the adjacent 4×4 pixel block. In the sub-block OBMC mode, every 4×4 pixel block of the current image block is processed, and the predicted values of the 2 rows/columns of pixels of each 4×4 block are changed according to the motion vector of the adjacent 4×4 pixel block.

The predicted value after the change is obtained by the following formula:

$$P = a \cdot P_{cur} + b \cdot P_{ner} \quad (1)$$

$P_{cur}$ and $P_{ner}$ represent the predicted values obtained according to the motion vector of the current 4×4 block (the motion vector of the current image block) and the motion vector of the adjacent 4×4 block (the motion vector of the adjacent image block), respectively. a and b are the corresponding weighting coefficients, and the sum of a and b is 1. P is the final predicted value. A fixed weighting coefficient is used in the OBMC technology. For example, a and b can take the following values:

for the first row: 3/4, 1/4;
for the second row: 7/8, 1/8;
for the third row: 15/16, 1/16;
for the fourth row: 31/32, 1/32.

Using the fixed weighting coefficients ignores the effect of the size of the image block and limits the improvement of coding efficiency. For example, if the current image block is relatively small, the motion vector of the current image block more accurately describes the real motion of the current image block. At this time, the motion compensation coefficient of the motion vector of the adjacent image block to the boundary pixels of the current image block may be reduced. Conversely, when the current image block is relatively large, the real motion of the boundary pixel may not be accurately described by the motion vector of the current image block. At this time, the motion compensation coefficient of the motion vector of the adjacent image block to the boundary pixel may be increased.

Considering the effect of the size of the image block, a motion compensation method is provided according to an embodiment of the present disclosure to improve the performance of motion compensation.

FIG. 5 is a schematic flowchart of a motion compensation method 500 according to an embodiment of the present disclosure. The method 500 may be performed by the system 100 shown in FIG. 1.

At 510, according to a first parameter and/or a second parameter, a weighting coefficient of a predicted value of a pixel to be processed is determined, where the pixel to be processed is a pixel in a boundary pixel block of a current image block, the first parameter is the size of the current image block or a distance between the pixel to be processed and the center position of the current image block, and the second parameter is the size of an adjacent image block of the current image block or a distance between the pixel to be processed and the center positions of the adjacent image block. In this disclosure, the pixel to be processed is also referred to as a "target pixel."

The center position of the image block may be the geometric center of the image block. For example, the pixel coordinate of the upper left corner of the image block is (0, 0), the pixel coordinate of the lower right corner is (w, h), and the center position is (w/2, h/2).

In the embodiments of the present disclosure, for pixels in the boundary pixel block of the image block, fixed weighting coefficients are no longer used, but the weighting coefficients are adaptively adjusted considering the effect of the size of the image block. In some embodiments, the size of the current image block or the distance between the pixel to be processed and the center position of the current image block (i.e., the first parameter), and/or, the size of the adjacent image block or distance between the pixel to be processed and the center position of the adjacent image block (i.e., the second parameter) may be considered.

In some embodiments, when the adjacent image block is on the top or bottom side of the current image block, the size of the current image block is the height of the current image block, and the size of the adjacent image block is the height of the adjacent image block. When the adjacent image block is on the left or right side of the current image block, the size of the current image block is the width of the current image block, and the size of the adjacent image block is the width of the adjacent image block.

The weighting coefficients may include a first coefficient and a second coefficient. The first coefficient is used to weight the first predicted value of the pixel to be processed determined according to the motion vector of the current image block (i.e., a in formula (1)), and second coefficient is used to weight the second predicted value of the pixel to be processed determined according to the motion vector of the adjacent image block (i.e., b in formula (1)).

In some embodiments, the first coefficient or the second coefficient may be determined according to the first parameter and a first mapping relationship. The first mapping relationship is a preset negative mapping relationship between the first parameter and the first coefficient, and the negative mapping relationship between the first parameter and the first coefficient indicates that the first coefficient decrease as the first parameter increases, or the first mapping relationship is a preset positive mapping relationship between the first parameter and the second coefficient, and the positive mapping relationship between the first parameter and the second coefficient indicates that the second coefficient increases as the first parameter increases.

In various embodiments of the present disclosure, the positive mapping relationship between the variable x and the variable y indicates that y increases as x increases, and y decreases as x decreases. Correspondingly, the negative mapping relationship between x and y indicates that y decreases as x increases, and y increases as x decreases. However, in the embodiments of the present disclosure, the specific functional relationship adopted by the positive mapping relationship or the negative mapping relationship is not limited.

In some embodiments, there is a negative mapping relationship between the first parameter and the first coefficient, or there is a positive mapping relationship between the first parameter and the second coefficient. That is to say, the first coefficient decreases with the increase of the first parameter and increases with the decrease of the first parameter, or, the second coefficient increases with the increase of the first parameter and decreases with the decrease of the first parameter.

For example, the first parameter is the size of the current image block (the scenario of the first parameter being the distance between the pixel to be processed and the center position of the current image block is similar to this). If the size of the current image block is relatively large (e.g., greater than a preset threshold), the first coefficient can use a smaller value (such as using a value smaller than a current fixed value of a), and the second coefficient can use a larger value (such as using a value greater than a current fixed value of b). If the size of the current image block is relatively small (such as smaller than the preset threshold), the first coefficient can use a larger value (such as using a value greater than the current fixed value of a), and the second coefficient can use a smaller value (such as using a value smaller than the current fixed value of b).

In some embodiments, if the first parameter is between a first threshold and a second threshold, it is determined that the first coefficient is a first preset value, and/or the second coefficient is a second preset value. The first threshold is greater than the second threshold.

In some embodiments, if the first parameter is greater than the first threshold, it is determined that the first coefficient is a third preset value, and/or, the second coefficient is a fourth preset value. The third preset value is smaller than the first preset value, and the fourth preset value is greater than the second preset value.

In some embodiments, if the first parameter is smaller than the second threshold, it is determined that the first coefficient is a fifth preset value, and/or, the second coefficient is a sixth preset value. The fifth preset value is greater than the first preset value, and the sixth preset value is smaller than the second preset value.

In some embodiments, different first coefficients and second coefficients are used for different ranges in which the first parameter is located. When the first parameter is between the first threshold and the second threshold, that is, when the first parameter is in the middle range, the first coefficient and the second coefficient can respectively adopt the middle values of the preset values, for example, the current values of the fixed values of a and b. When the first parameter is greater than the first threshold, the first coefficient may use a smaller preset value, for example, a value smaller than the current fixed value of a, and the second coefficient may use a larger preset value, for example, a value greater than the current fixed value of b. When the first parameter is smaller than the second threshold, the first coefficient may use a larger preset value, for example, a value greater than the current fixed value of a, and the second coefficient may use a smaller preset value, for example, a value smaller than the current fixed value of b.

For example, the first threshold may be 64, and the second threshold may be 8.

For example, when OBMC processing is performed on the upper 4×4 pixel block of the current image block, if the height of the current image block is greater than or equal to 64, the OBMC coefficient a of the first row of pixels can be reduced from the original value of $3/4$ to $2/3$, and the coefficient b can be increased from the original value of $1/4$ to $1/3$. If the height of the current image block is smaller than or equal to 8, the OBMC coefficient a of the first row of pixels can be increased from the original value of $3/4$ to $4/5$, and the coefficient b can be reduced from the original value of $1/4$ to $1/5$.

When the current image block is larger, there is a larger deviation between the motion trend of the boundary pixels of the image block and the motion vector of the image block. Conversely, if the current image block is relatively small, the motion vector of the image block can better represent the movement of boundary pixels. Therefore, when the current image block is relatively large, the weighting coefficient a can be appropriately reduced based on the original coefficient value, and the weighting coefficient b can be increased; conversely, if the current image block is relatively small, the weighting coefficient a can be appropriately increased based on the original coefficient value, and the weighting coefficient b can be reduced. In this way, the weighting coefficients used can better reflect the real motion vectors of the boundary pixels, thereby improving the performance of motion compensation.

In some embodiments, the threshold in the present disclosure may be used as the preset value at the encoding end and the decoding end, or the threshold information may be written into the bitstream at the encoding end, and the threshold information may be obtained by the decoding end from the bitstream. At the encoding end, the threshold information can be written into the video parameter set (VPS), sequence parameter set (SPS), image parameter set (PPS), sequence header, image header, slice header, and etc.

In an embodiment of the present disclosure, the first coefficient or the second coefficient may be determined according to the second parameter and a second mapping relationship. The second mapping relationship is a preset positive mapping relationship between the second parameter and the first coefficient, and the positive mapping relationship between the second parameter and the first coefficient indicates that the first coefficient increases as the second parameter increases, or the second mapping relationship is a preset negative mapping relationship between the second parameter and the second coefficient, and the negative mapping relationship between the second parameter and the second coefficient indicates that the second coefficient decreases as the second parameter increases.

In some embodiments, there is a positive mapping relationship between the second parameter and the first coefficient, or there is a negative mapping relationship between the second parameter and the second coefficient. That is, the first coefficient increases with the increase of the second parameter and decreases with the decrease of the second parameter, or, the second coefficient decreases with the increase of the second parameter and decreases with the increase of the second parameter.

For example, the second parameter is the size of the adjacent image block (the scenario of the second parameter being the distance between the pixel to be processed and the center position of the adjacent image block is similar to this). If the size of the adjacent image block is relatively large (e.g., greater than the preset threshold), the first coefficient can use a larger value (such as using a value greater than the current fixed value of a), and the second coefficient can use a smaller value (such as using a value smaller than the current fixed value of b). If the size of the adjacent image block is relatively small (such as smaller than the preset threshold), the first coefficient can use a smaller value (such as using a value smaller than the current fixed value of a), and the second coefficient can use a larger value (such as using a value greater than the current fixed value of b).

In some embodiments, the threshold in the present disclosure may be used as the preset value at the encoding end and the decoding end, or the threshold information may be written into the bitstream at the encoding end, and the threshold information may be obtained by the decoding end from the bitstream. At the encoding end, the threshold information can be written into the video parameter set (VPS), sequence parameter set (SPS), image parameter set (PPS), sequence header, image header, slice header, and etc.

In some embodiments, if the second parameter is between the first threshold and the second threshold, it is determined that the first coefficient is the first preset value, and/or the second coefficient is the second preset value. The first threshold is greater than the second threshold.

In some embodiments, if the second parameter is greater than the first threshold, it is determined that the first coefficient is the fifth preset value, and/or, the second coefficient is the sixth preset value. The fifth preset value is greater than the first preset value, and the sixth preset value is smaller than the second preset value.

In some embodiments, if the second parameter is smaller than the second threshold, it is determined that the first coefficient is the third preset value, and/or, the second coefficient is the fourth preset value. The third preset value is smaller than the first preset value, and the fourth preset value is greater than the second preset value.

In some embodiments, different first coefficients and second coefficients are used for different ranges in which the second parameter is located. When the second parameter is between the first threshold and the second threshold, that is, when the second parameter is in the middle range, the first coefficient and the second coefficient can respectively adopt the middle values of the preset values, for example, the current values of the fixed values of a and b. When the second parameter is smaller than the second threshold, the first coefficient may use a smaller preset value, for example, a value smaller than the current fixed value of a, and the second coefficient may use a larger preset value, for example, a value greater than the current fixed value of b. When the second parameter is greater than the first threshold, the first coefficient may use a larger preset value, for example, a value greater than the current fixed value of a, and the second coefficient may use a smaller preset value, for example, a value smaller than the current fixed value of b.

When the adjacent image block is larger, there is a larger deviation between the motion trend of the boundary pixels of the image block and the motion vector of the adjacent image block. Conversely, if the adjacent image block is relatively small, the motion vector of the adjacent image block can better represent the movement of boundary pixels of the current image block. Therefore, when the adjacent image block is relatively small, the weighting coefficient a can be appropriately reduced based on the original coefficient value, and the weighting coefficient b can be increased; conversely, if the adjacent image block is relatively large, the weighting coefficient a can be appropriately increased based on the original coefficient value, and the weighting coefficient b can be reduced. In this way, the weighting coefficients used can better reflect the real motion vectors of the boundary pixels, thereby improving the performance of motion compensation.

In some embodiments, the threshold in the present disclosure may be used as the preset value at the encoding end and the decoding end, or the threshold information may be written into the bitstream at the encoding end, and the threshold information may be obtained by the decoding end from the bitstream. At the encoding end, the threshold information can be written into the video parameter set (VPS), sequence parameter set (SPS), image parameter set (PPS), sequence header, image header, slice header, and etc.

In one embodiment of the present disclosure, the weighting coefficient may be determined according to a ratio of the first parameter to the second parameter.

In the foregoing embodiments, the influence of only one of the first parameter and the second parameter is considered when adjusting the weighting coefficients, that is, only one factor of the current image block and the adjacent image block is considered. In some embodiments, the influence of the two parameters of the first parameter and the second parameter is considered simultaneously, that is, the two factors of the current image block and the adjacent image block are considered jointly. In some embodiments, the weighting coefficients may be adjusted according to the ratio of the first parameter to the second parameter, and different weighting coefficients may be used for different ratios.

In an embodiment of the present disclosure, the first coefficient or the second coefficient may be determined according to the ratio of the first parameter to the second parameter, and a third mapping relationship. The third mapping relationship is a preset negative mapping relationship between the ratio and the first coefficient, and the negative mapping relationship between the ratio and the first coefficient indicates that the first coefficient decreases as the ratio increases, or the third mapping relationship is a preset positive mapping relationship between the ratio and the second coefficient, and the positive mapping relationship between the ratio and the second coefficient indicates that the second coefficient increases as the ratio increases.

In some embodiments, there is a negative mapping relationship between the ratio of the first parameter to the second parameter, and the first coefficient, or there is a positive mapping relationship between the ratio and the second coefficient. That is, the first coefficient decreases with the increase of the ratio and increases with the decrease of the ratio, or, the second coefficient increases with the increase of the ratio and decreases with the decrease of the ratio.

For example, if the ratio is relatively large, the first coefficient can use a smaller value (such as using a value smaller than the current fixed value of a), and the second coefficient can use a larger value (such as using a value greater than the current fixed value of b). If the ratio is relatively small, the first coefficient can use a larger value (such as using a value greater than the current fixed value of a), and the second coefficient can use a smaller value (such as using a value smaller than the current fixed value of b).

In some embodiments, the second coefficient b may be determined according to the following formulas:

$$b = b_{org} \div \left(1 + \frac{\log_2 h_n / h_c}{\max\{\log_2 H_n / H_c\}}\right) (h_n > h_c) \quad (2)$$

$$b = b_{org} \cdot \left(1 + \frac{\log_2 h_c / h_n}{\max\{\log_2 H_n / H_c\}}\right) (h_c > h_n) \quad (3)$$

$h_c$ denotes the first parameter, $h_n$ denotes the second parameter, the maximum value of $\log_2 h_n/h_c$ can be denoted as max $\{\log_2 H_n/H_c\}$, $b_{org}$ denotes the current fixed second coefficient.

Figure 6:
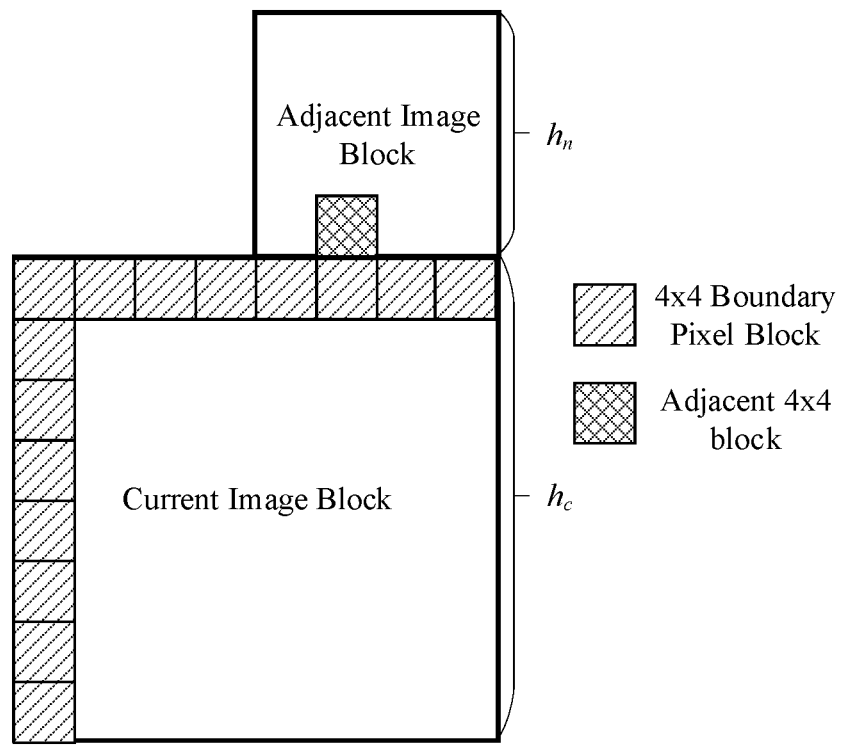
FIG. 6 is a schematic diagram showing sizes of a current image block and an adjacent image block according to an embodiment of the present disclosure.

As shown in FIG. 6, $h_c$ and $h_n$ are the sizes of the current image block and the adjacent image block, respectively. According to the different sizes of the image block supported by the encoder, the value spaces of are also different. Generally, the size of the image block can vary from 4×4 to 128×128, and the value space of $h_n/h_c$ is $\{1/32, 1/16, 1/8, 1/4, 1/2, 1, 2, 4, 8, 16, 32\}$. The value space of $\log_2 h_n/h_c$ can be $\{-5, -4, -3, -2, -1, 0, 1, 2, 3, 4, 5\}$. According to formulas (2) and (3), the adjusted b is in the range of $(b_{org}/2, 2b_{org})$.

After the second coefficient b is obtained using formulas (2) and (3), the first coefficient a can be obtained according to the sum of a and b being 1.

In formulas (2) and (3) above, different formulas are respectively provided for $h_n > h_c$ and $h_c > h_n$, which is not limited in the embodiments of the present disclosure. In other words, one of the formulas can be used without distinguishing between scenarios of $h_n > h_c$ and $h_c > h_n$.

In some embodiments, in order to reduce the implementation complexity in the encoding and decoding system, the values of a and/or b, or the approximate values of a and/or b after rounding to integers, may be pre-calculated according to the above formulas and the values of $h_c$ and $h_n$. A look-up table is preset in the encoding and decoding system, and the corresponding value is obtained through the look-up table according to $h_c$ and $h_n$. For example, the value of b can be obtained by looking up the table, and then the value of a can be obtained according to the equation of a+b=1. As an example, the weighting coefficient b of the first row/column of pixels of the boundary pixel block may be obtained using the following table:

TABLE 1

| | $h_n$ | | | | | |
|---|---|---|---|---|---|---|
| $h_c$ | 4 | 8 | 16 | 32 | 64 | 128 |
| 4 | 1/4 | 5/24 | 5/28 | 5/32 | 5/36 | 1/8 |
| 8 | 3/10 | 1/4 | 5/24 | 5/28 | 5/32 | 5/36 |
| 16 | 7/20 | 3/10 | 1/4 | 5/24 | 5/28 | 5/32 |

TABLE 1-continued

| | $h_n$ | | | | | |
|---|---|---|---|---|---|---|
| $h_c$ | 4 | 8 | 16 | 32 | 64 | 128 |
| 32 | 2/5 | 7/20 | 3/10 | 1/4 | 5/24 | 5/28 |
| 64 | 9/20 | 2/5 | 7/20 | 3/10 | 1/4 | 5/24 |
| 128 | 1/2 | 9/20 | 2/5 | 7/20 | 3/10 | 1/4 |

Referring again to FIG. 5, at 520, a predicted value of the pixel to be processed is determined according to the weighting coefficients.

After obtaining the weighting coefficients using the foregoing method, the weighting coefficients are used to determine the predicted value of the pixel to be processed.

In some embodiments, a first predicted value of the pixel to be processed may be determined according to the motion vector of the current image block, a second predicted value of the pixel to be processed may be determined according to the motion vector of the adjacent image block, and the predicted value of the pixel to be processed is obtained as a weighted sum of the first predicted value and the second predicted value according to the weighting coefficients.

For example, for a pixel in the boundary pixel block of the current image block, a corresponding similar block can be determined according to the motion vector of the current image block, and the value of the corresponding pixel in the similar block of the pixel is the first predicted value $P_{cur}$. Similarly, the second predicted value $P_{ner}$ can be obtained according to the motion vector of the adjacent image block. Then, the weighting coefficients a and b are obtained with the above-described method, and the predicted value P of the pixel is obtained according to formula (1).

After the predicted value of the pixel is obtained with the above method, for the encoding end, encoding may be performed based on the predicted value, and for the decoding end, decoding may be performed based on the predicted value.

In the technical solution of the embodiments of the present disclosure, the weighting coefficient of the predicted value of the pixels in the boundary pixel block of the current image block is determined according to the influence of the current image block and/or the adjacent image block. Therefore, the motion vector of the adjacent image block can be better used to process the predicted value of the pixel, so that the performance of motion compensation can be improved.

In addition, when the technical solution of the embodiments of the present disclosure is adopted, the encoding end and the decoding end use the same method to determine the weighting coefficients, so the weighting coefficients do not need to be written into the bitstream, thereby brining no additional cost.

The motion compensation method of the embodiments of the present disclosure is described in detail above, and a motion compensation device and a computer system of the embodiments of the present disclosure is described below.

Figure 7:
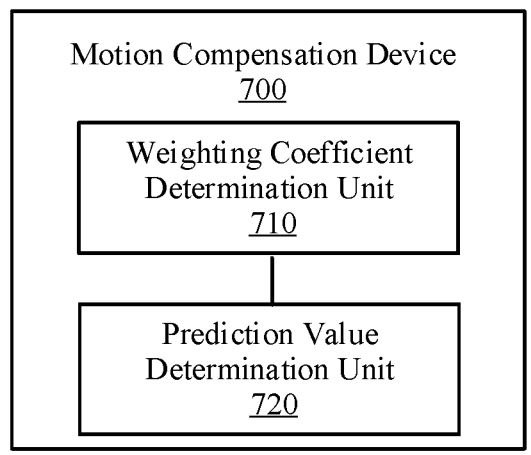
FIG. 7 is a schematic block diagram of a motion compensation device according to an embodiment of the present disclosure.

FIG. 7 is a schematic block diagram of a motion compensation device 700 according to an embodiment of the present disclosure. The device 700 can execute the motion compensation method according to the embodiments of the present disclosure.

As shown in FIG. 7, the device 700 includes a weighting coefficient determination unit 710 and a prediction value determination unit 720.

The weighting coefficient determination unit 710 is configured to determine a weighting coefficient of a predicted value of a pixel to be processed according to a first parameter and/or a second parameter. The pixel to be processed is a pixel in a boundary pixel block of a current image block, the first parameter is the size of the current image block or the distance between the pixel to be processed and a center position of the current image block, and the second parameter is the size of an adjacent image block of the current image block or the distance between the pixel to be processed and a center position of the adjacent image block;

The prediction value determination unit 720 is configured to determine the predicted value of the pixel to be processed according to the weighting coefficient.

In some embodiments of the disclosure, the prediction value determination unit 720 is specifically configured to determine a first predicted value of the pixel to be processed according to a motion vector of the current image block, determine a second predicted value of the pixel to be processed according to a motion vector of the adjacent image block, and obtain the predicted value of the pixel to be processed as a weighted sum of the first predicted value and the second predicted value according to the weighting coefficients. The weighting coefficients of the predicted value include a first coefficient and a second coefficient. The first coefficient is used to weight the first predicted value, and the second coefficient is used to weight the second predicted value.

In some embodiments of the disclosure, the weighting coefficient determination unit 710 is specifically configured to determine the first coefficient or the second coefficient according to the first parameter and a first mapping relationship. In some embodiments, the first mapping relationship is a preset negative mapping relationship between the first parameter and the first coefficient, and the negative mapping relationship between the first parameter and the first coefficient indicates that the first coefficient decrease as the first parameter increases. In some embodiments, the first mapping relationship is a preset positive mapping relationship between the first parameter and the second coefficient, and the positive mapping relationship between the first parameter and the second coefficient indicates that the second coefficient increases as the first parameter increases.

In some embodiments of the disclosure, the weighting coefficient determination unit 710 is specifically configured to, if the first parameter is between a first threshold and a second threshold, determine the first coefficient as a first preset value, and/or, the second coefficient as a second preset value, where the first threshold is greater than the second threshold.

In some embodiments, the weighting coefficient determination unit 710 is specifically configured to, if the first parameter is greater than the first threshold, determine the first coefficient as a third preset value, and/or, the second coefficient as a fourth preset value, where the third preset value is smaller than the first preset value, and the fourth preset value is greater than the second preset value.

In some embodiments, the weighting coefficient determination unit 710 is specifically configured to, if the first parameter is smaller than the second threshold, determine the first coefficient as a fifth preset value, and/or, the second coefficient as a sixth preset value, where the fifth preset value is greater than the first preset value, and the sixth preset value is smaller than the second preset value.

In some embodiments, the threshold in the present disclosure may be used as the preset value at the encoding end and the decoding end, or the threshold information may be written into the bitstream at the encoding end, and the threshold information may be obtained by the decoding end from the bitstream. At the encoding end, the threshold information can be written into the video parameter set (VPS), sequence parameter set (SPS), image parameter set (PPS), sequence header, image header, slice header, and etc.

In some embodiments of the disclosure, the weighting coefficient determination unit 710 is specifically configured to determine the first coefficient or the second coefficient according to the second parameter and a second mapping relationship. In some embodiments, the second mapping relationship is a preset positive mapping relationship between the second parameter and the first coefficient, and the positive mapping relationship between the second parameter and the first coefficient indicates that the first coefficient increases as the second parameter increases. In some embodiments, the second mapping relationship is a preset negative mapping relationship between the second parameter and the second coefficient, and the negative mapping relationship between the second parameter and the second coefficient indicates that the second coefficient decreases as the second parameter increases.

In some embodiments of the disclosure, the weighting coefficient determination unit 710 is specifically configured to, if the second parameter is between the first threshold and the second threshold, determine the first coefficient as the first preset value, and/or the second coefficient as the second preset value, where the first threshold is greater than the second threshold.

In some embodiments, the weighting coefficient determination unit 710 is specifically configured to, if the second parameter is greater than the first threshold, determine the first coefficient as the fifth preset value, and/or, the second coefficient as the sixth preset value, where the fifth preset value is greater than the first preset value, and the sixth preset value is smaller than the second preset value.

In some embodiments, the weighting coefficient determination unit 710 is specifically configured to, if the second parameter is smaller than the second threshold, determine the first coefficient as the third preset value, and/or, the second coefficient as the fourth preset value, where the third preset value is smaller than the first preset value, and the fourth preset value is greater than the second preset value.

In some embodiments, the threshold in the present disclosure may be used as the preset value at the encoding end and the decoding end, or the threshold information may be written into the bitstream at the encoding end, and the threshold information may be obtained by the decoding end from the bitstream. At the encoding end, the threshold information can be written into the video parameter set (VPS), sequence parameter set (SPS), image parameter set (PPS), sequence header, image header, slice header, and etc.

In some embodiments of the disclosure, the weighting coefficient determination unit 710 is specifically configured to determine the weighting coefficient of the predicted value according to a ratio of the first parameter to the second parameter.

In some embodiments of the disclosure, the weighting coefficient determination unit 710 is specifically configured to determine the first coefficient or the second coefficient according to the ratio of the first parameter to the second parameter, and a third mapping relationship. The third mapping relationship is a preset negative mapping relationship between the ratio and the first coefficient, and the negative mapping relationship between the ratio and the first coefficient indicates that the first coefficient decreases as the ratio increases, or the third mapping relationship is a preset positive mapping relationship between the ratio and the second coefficient, and the positive mapping relationship between the ratio and the second coefficient indicates that the second coefficient increases as the ratio increases.

In some embodiments of the disclosure, when the adjacent image block is on the top or bottom side of the current image block, the size of the current image block is the height of the current image block, and the size of the adjacent image block is the height of the adjacent image block.

In some embodiments, when the adjacent image block is on the left or right side of the current image block, the size of the current image block is the width of the current image block, and the size of the adjacent image block is the width of the adjacent image block.

The motion compensation device according to the embodiments of the present disclosure may be a chip, which may be specifically implemented by a circuit, but the embodiments of the present disclosure does not limit the specific implementation form.

An encoder is further provided according to an embodiment of the present disclosure and the encoder includes the above-described motion compensation device provided by the embodiments of the present disclosure.

A decoder is further provided according to an embodiment of the present disclosure and the decoder includes the above-described motion compensation device provided by the embodiments of the present disclosure.

Figure 8:
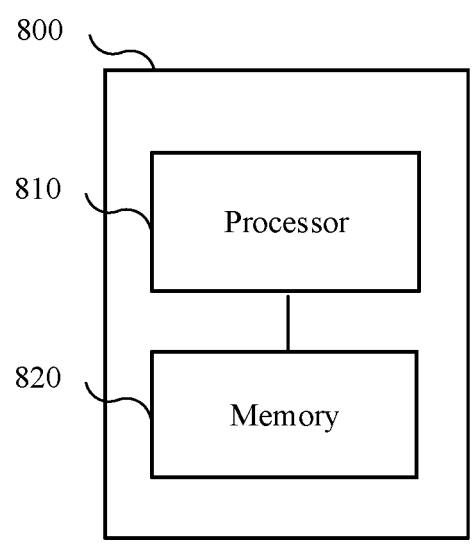
FIG. 8 is a schematic block diagram of a computer system according to an embodiment of the present disclosure.

FIG. 8 is a schematic block diagram of a computer system 800 according to an embodiment of the present disclosure.

As shown in FIG. 8, the computer system 800 includes a processor 810 and a memory 820.

The computer system 800 may also include components generally included in other computer systems, such as input and output devices, communication interfaces, or the like, which are not limited in the embodiments of the present disclosure.

The memory 820 is used to store computer executable instructions.

The memory 820 may be one of various types of memories, may include a high-speed random-access memory (RAM), and may include a non-volatile memory such as at least one disk memory, which is not limited in the embodiments of the present disclosure.

The processor 810 is configured to access the memory 820 and execute the computer-executable instructions to perform a method consistent with the present disclosure, such as one of the above-described example method.

The processor 810 may include a microprocessor, a field-programmable gate array (FPGA), a central processing unit (CPU), a graphics processing unit (GPU), and etc., which is not limited in the embodiments of the present disclosure.

The motion compensation device and the computer system according to the embodiments of the present disclosure may correspond to an execution subject of the motion compensation method according to the embodiments of the present disclosure, and the above and other operations and/or functions of each module in the motion compensation device and the computer system are to realize the corresponding processes of the above-described methods, which are not repeated here.

An electronic device is further provided according to an embodiment of the present disclosure and the electronic device may include the above-described motion compensation device or the computer system of various embodiments of the present disclosure.

A computer storage medium is also provided according to an embodiment of the present disclosure and the computer storage medium stores program instructions. The program instructions can be used to instruct to perform the motion compensation method of the above-described embodiments of the present disclosure.

The term "and/or" in this disclosure is merely an association relationship describing the associated objects and indicates that there may be three relationships. For example, A and/or B may indicate three cases such as A existing alone, A and B both existing, and B existing alone. In addition, the character "/" in this disclosure generally indicates that the related objects before and after are in an "or" relationship.

Those of ordinary skills in the art may realize that the units and algorithms described in the embodiments of the disclosure can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of this disclosure.

Those of ordinary skills in the art can clearly understand that for the convenience and conciseness of the description, the specific working process of the system, device and unit described above can refer to the corresponding process in the foregoing method embodiments, which will not be repeated here.

In the embodiments provided in this disclosure, the disclosed system, device, and method may be implemented in other ways. For example, the device embodiments described above are only schematic. For example, the division of the units is only a division of logical functions. In actual implementation, there may be other divisions, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place or may be distributed on multiple network units. Some or all of the units may be selected according to actual needs to achieve the purpose of the solution of the embodiments.

In addition, each functional unit in each embodiment of the present disclosure may be integrated into one processing unit, or each unit may exist alone physically, or two or more units are integrated into one unit. The above integrated unit can be implemented in the form of hardware or software function unit.

If the integrated unit is implemented in the form of a software functional unit and sold or used as a standalone product, it may be stored in a computer-readable storage medium. The technical solution of the present disclosure or the part that contributes to the existing technology, or all or part of the technical solution can be embodied in the form of a software product. The computer software product is stored in a storage medium and include several instructions to enable a computer device (for example, a personal computer, server, or a network device, etc.) to perform all or part of the processes of the methods described in various embodiments of the present disclosure. The storage medium includes a U disk, a portable hard disk, a read-only memory (ROM), a random-access memory (RAM), a magnetic disk or an optical disk and other media that can store program instructions.

The above is only the specific implementations of this disclosure, but the scope of this disclosure is not limited to this. Any person skilled in the art can easily think of changes or replacements within the technical scope disclosed in this disclosure, which should be covered by the scope of this disclosure. Therefore, the scope of the invention shall be subject to the appended claims.

What is claimed is:

1. A motion compensation method comprising:
   determining one or more weighting coefficients of a predicted value of a target pixel to be processed according to at least one of a first parameter or a second parameter, the one or more weighting coefficients including a first coefficient and a second coefficient, and determining the one or more weighting coefficients including:
   determining the first coefficient based on the first parameter according to a preset negative mapping relationship that the first coefficient decreases as the first parameter increases; or
   determining the second coefficient based on the first parameter according to a preset positive mapping relationship that the second coefficient increases as the first parameter increases;
   determining the predicted value of the target pixel according to the weighting coefficient including:
   determining a first predicted value of the target pixel according to a motion vector of a current image block;
   determining a second predicted value of the target pixel according to a motion vector of an adjacent image block; and
   obtaining the predicted value of the target pixel as a weighted sum of the first predicted value weighted by the first coefficient and the second predicted value weighted by the second coefficient;
   wherein:
   the target pixel is in a boundary pixel block of the current image block;
   the first parameter is a size of the current image block or a distance between the target pixel and a center position of the current image block; and
   the second parameter is a size of the adjacent image block of the current image block or a distance between the target pixel and a center position of the adjacent image block.

2. The method of claim 1, wherein determining the one or more weighting coefficients of the predicted value of the target pixel further includes:
   in response to the first parameter being between a first threshold and a second threshold, determining the first coefficient as a first preset value and/or the second coefficient as a second preset value, the first threshold being greater than the second threshold;
   in response to the first parameter being greater than the first threshold, determining the first coefficient as a third preset value and/or the second coefficient as a fourth preset value, the third preset value being smaller than the first preset value, and the fourth preset value being greater than the second preset value; or
   in response to the first parameter being smaller than the second threshold, determining the first coefficient as a fifth preset value and/or the second coefficient as a sixth preset value, the fifth preset value being greater than the first preset value, and the sixth preset value being smaller than the second preset value.

3. The method of claim 1, wherein determining the one or more weighting coefficients of the predicted value of the target pixel further includes:
   determining the first coefficient based on the second parameter according to a preset positive mapping relationship that the first coefficient increases as the second parameter increases; or
   determining the second coefficient based on the second parameter according to a preset negative mapping relationship that the second coefficient decreases as the second parameter increases.

4. The method of claim 1, wherein determining the one or more weighting coefficients of the predicted value of the target pixel includes:
   in response to the second parameter being between a first threshold and a second threshold, determining the first coefficient as a first preset value and/or the second coefficient as a second preset value, the first threshold being greater than the second threshold;
   in response to the second parameter being smaller than the second threshold, determining the first coefficient as a third preset value and/or the second coefficient as a fourth preset value, the third preset value being smaller than the first preset value, and the fourth preset value being greater than the second preset value; or
   in response to the second parameter being greater than the first threshold, determining the first coefficient as a fifth preset value and/or the second coefficient as a sixth preset value, the fifth preset value being greater than the first preset value, and the sixth preset value being smaller than the second preset value.

5. The method of claim 1, wherein determining the one or more weighting coefficients of the predicted value of the target pixel includes determining the one or more weighting coefficients according to a ratio of the first parameter to the second parameter.

6. The method of claim 5, wherein determining the one or more weighting coefficients according to the ratio of the first parameter to the second parameter includes:
   determining the first coefficient based on the ratio according to a preset negative mapping relationship that the first coefficient decreases as the ratio increases; or
   determining the second coefficient based on the ratio according to a preset positive mapping relationship that the second coefficient increases as the ratio increases.

7. The method of claim 1, wherein:
   the adjacent image block is above or below the current image block;
   a size of the current image block is a height of the current image block; and
   a size of the adjacent image block is a height of the adjacent image block.

8. The method of claim 1, wherein:
   the adjacent image block is on a left or right side of the current image block;
   a size of the current image block is a width of the current image block; and
   a size of the adjacent image block is a width of the adjacent image block.

9. A computer system comprising:
   a memory storing computer executable instructions; and
   a processor configured to access the memory and execute the instructions to:
   determine one or more weighting coefficients of a predicted value of a target pixel to be processed according to at least one of a first parameter or a second parameter, the one or more weighting coefficients including a first coefficient and a second coefficient, and determining the one or more weighting coefficients including:
  determining the first coefficient based on the first parameter according to a preset negative mapping relationship that the first coefficient decreases as the first parameter increases; or
  determining the second coefficient based on the first parameter according to a preset positive mapping relationship that the second coefficient increases as the first parameter increases; and
determine the predicted value of the target pixel according to the weighting coefficient, including:
  determining a first predicted value of the target pixel according to a motion vector of a current image block;
  determining a second predicted value of the target pixel according to a motion vector of an adjacent image block; and
  obtaining the predicted value of the target pixel as a weighted sum of the first predicted value weighted by the first coefficient and the second predicted value weighted by the second coefficient;
wherein:
  the target pixel is in a boundary pixel block of the current image block;
  the first parameter is a size of the current image block or a distance between the target pixel and a center position of the current image block; and
  the second parameter is a size of the adjacent image block of the current image block or a distance between the target pixel and a center position of the adjacent image block.

10. The computer system of claim 9, wherein the processor is further configured to execute the instructions to:
  in response to the first parameter being between a first threshold and a second threshold, determine the first coefficient as a first preset value and/or the second coefficient as a second preset value, the first threshold being greater than the second threshold;
  in response to the first parameter being greater than the first threshold, determine the first coefficient as a third preset value and/or the second coefficient as a fourth preset value, the third preset value being smaller than the first preset value, and the fourth preset value being greater than the second preset value; or
  in response to the first parameter being smaller than the second threshold, determine the first coefficient as a fifth preset value and/or the second coefficient as a sixth preset value, the fifth preset value being greater than the first preset value, and the sixth preset value being smaller than the second preset value.

11. The computer system of claim 9, wherein the processor is further configured to execute the instructions to:
  determine the first coefficient based on the second parameter according to a preset positive mapping relationship that the first coefficient increases as the second parameter increases; or
  determine the second coefficient based on the second parameter according to a preset negative mapping relationship that the second coefficient decreases as the second parameter increases.

12. The computer system of claim 9, wherein the processor is further configured to execute the instructions to:
  in response to the second parameter being between a first threshold and a second threshold, determine the first coefficient as a first preset value and/or the second coefficient as a second preset value, the first threshold being greater than the second threshold;
  in response to the second parameter being smaller than the second threshold, determine the first coefficient as a third preset value and/or the second coefficient as a fourth preset value, the third preset value being smaller than the first preset value, and the fourth preset value being greater than the second preset value; or
  in response to the second parameter being greater than the first threshold, determine the first coefficient as a fifth preset value and/or the second coefficient as a sixth preset value, the fifth preset value being greater than the first preset value, and the sixth preset value being smaller than the second preset value.

13. The computer system of claim 9, wherein the processor is further configured to execute the instructions to determine the one or more weighting coefficients according to a ratio of the first parameter to the second parameter.

14. The computer system of claim 13, wherein the processor is further configured to execute the instructions to:
  determine the first coefficient based on the ratio according to a preset negative mapping relationship that the first coefficient decreases as the ratio increases; or
  determine the second coefficient based on the ratio according to a preset positive mapping relationship that the second coefficient increases as the ratio increases.

15. The computer system of claim 9, wherein:
the adjacent image block is above or below the current image block;
a size of the current image block is a height of the current image block; and
a size of the adjacent image block is a height of the adjacent image block.

16. The computer system of claim 9, wherein:
the adjacent image block is on a left or right side of the current image block;
a size of the current image block is a width of the current image block; and
a size of the adjacent image block is a width of the adjacent image block.

* * * * *